Jan. 22, 1924.
O. IHLAU
NONSKID TIRE
Filed July 27, 1921
1,481,668
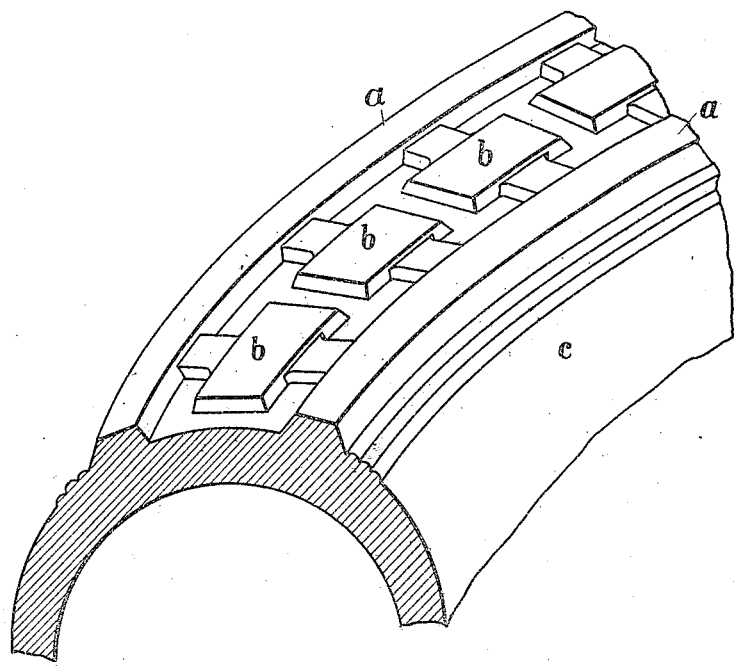
INVENTOR
OTTO IHLAU
BY Howson and Howson
ATTORNEYS Patented Jan. 22, 1924.

1,481,668

UNITED STATES PATENT OFFICE.

OTTO IHLAU, OF HANOVER, GERMANY, ASSIGNOR TO CONTINENTAL CAOUTCHOUC-UND GUTTA-PERCHA-COMPAGNIE, OF HANOVER, GERMANY, A FIRM.

NONSKID TIRE.

Application filed July 27, 1921. Serial No. 487,926.

*To all whom it may concern:*

Be it known that I, OTTO IHLAU, a citizen of the Republic of Germany, and residing at 54 Langenforth, Hanover, Germany, have invented certain new and useful Improvements in Nonskid Tires; and I do hereby declare the following to be a full, clear, and exact description of the invention.

This invention relates to an india-rubber non-skid tire wherein two longitudinal ribs are arranged on the tread at a certain distance from each other.

The present construction is shown in the accompanying drawing, in which the figure illustrates the tread portion of the tire in perspective.

The present invention, is distinguished from known tires, by the fact that cross-shaped skid-resisting members *b* are arranged between the longitudinal ribs *a*.

In the case of these skid-resisting blocks, the part of the block extending longitudinally is kept somewhat higher than the transverse part. The transverse parts are rounded at their points of attachment to the longitudinal parts. On the outer sides of the two longitudinal ribs there are provided three lower ribs *c*. A non-skid tire of this description results, more especially when starting or stopping the vehicle, in a splendid grip on the ground, because there are numerous gripping teeth. Similarly however there are numerous gripping edges in the vertical direction, which, as the vehicle slips laterally, give rise to a multiple resistance to slipping.

It may be pointed out that the circumferentially extending portions of the blocks *b* form in effect an interrupted mid rib for the tread which is of greater transverse extent than either of the continuous longitudinal ribs *a*, between which the blocks are arranged.

In the case of the present invention, owing to the characteristic form of the tread and of the cruciform blocks, protection against slipping is provided which is operative in all directions. The above-mentioned rounding off of the transverse portions of the cross-shaped blocks, at the points where they join on to the longitudinal parts, is provided in order to supply a gradual transition which will obviate any tearing or injuring of the transverse parts of the cruciform blocks. This rounding off might, of course, also be effected at the points of junction with the longitudinal ribs.

I claim:

1. A skid-resisting tire having on its tread a plurality of transversely spaced continuous circumferential ribs and intermediate cruciform blocks, the circumferentially extending portions of the blocks constituting an interrupted mid rib of substantially the same elevation as the transversely spaced continuous ribs, and the transverse portions of said cruciform blocks extending between said continuous ribs and the circumferentially extending portions of the blocks.

2. A skid-resisting tire having on its tread a plurality of transversely spaced continuous circumferential ribs and intermediate cruciform blocks, the circumferentially extending portions of the blocks having a greater transverse width than the continuous ribs, and constituting an interrupted mid rib of substantially the same elevation as the transversely spaced continuous ribs, and the transverse portions of said cruciform blocks extending between said continuous ribs and the circumferentially extending portions of the blocks.

In testimony that I claim the foregoing as my invention, I have signed my name.

OTTO IHLAU.